(12) United States Patent
Dezonno et al.

(10) Patent No.: US 6,868,153 B2
(45) Date of Patent: Mar. 15, 2005

(54) CUSTOMER TOUCH-POINT SCORING SYSTEM

(75) Inventors: Anthony Dezonno, Bloomingdale, IL (US); Jeff Hodson, Wheaton, IL (US); Roger Sumner, Batavia, IL (US); Carlo Bonifazi, Woodridge, IL (US); Mark Michelson, Elburn, IL (US); Robert Beckstrom, Bolingbrook, IL (US); Mark Power, Carol Stream, IL (US); Craig Shambaugh, Wheaton, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 543 days.

(21) Appl. No.: 10/096,235

(22) Filed: Mar. 12, 2002

(65) Prior Publication Data

US 2003/0174829 A1 Sep. 18, 2003

(51) Int. Cl.[7] ............................................. H04M 3/523
(52) U.S. Cl. ............................ 379/265.03; 379/265.05; 379/265.06; 379/265.08; 379/266.01
(58) Field of Search ...................... 379/265.01, 265.02, 379/265.03, 265.05, 265.06, 265.08, 266.01

(56) References Cited

U.S. PATENT DOCUMENTS

| | | | | |
|---|---|---|---|---|
| 5,313,517 A | * | 5/1994 | Inaguma ................ | 379/266.06 |
| 5,546,456 A | | 8/1996 | Vilsoet et al. ......... | 379/265.08 |
| 5,715,306 A | * | 2/1998 | Sunderman et al. ... | 379/265.02 |
| 5,715,307 A | * | 2/1998 | Zazzera ................. | 379/265.03 |
| 5,953,405 A | * | 9/1999 | Miloslavsky ........... | 379/265.01 |
| 5,978,465 A | | 11/1999 | Corduroy et al. ...... | 379/265.02 |
| 6,061,433 A | * | 5/2000 | Polcyn et al. ............ | 379/93.12 |
| 6,154,527 A | | 11/2000 | Porter et al. ............. | 379/88.18 |
| 6,157,655 A | | 12/2000 | Shtivelman ................. | 370/412 |
| 6,160,875 A | * | 12/2000 | Park et al. .................. | 379/133 |
| 6,163,607 A | | 12/2000 | Bogart et al. .......... | 379/266.01 |
| 6,173,053 B1 | | 1/2001 | Bogart et al. .......... | 379/266.01 |
| 6,212,178 B1 | | 4/2001 | Beck et al. ................. | 370/352 |
| 6,314,402 B1 | | 11/2001 | Monaco et al. ............. | 704/275 |
| 6,332,154 B2 | | 12/2001 | Beck et al. ................. | 709/204 |
| 6,334,107 B1 | | 12/2001 | Gale et al. ..................... | 705/10 |
| 6,459,788 B1 | * | 10/2002 | Khuc et al. ............ | 379/265.09 |

FOREIGN PATENT DOCUMENTS

| | | | |
|---|---|---|---|
| EP | 1026871 | 1/2000 | .......... H04M/3/493 |
| EP | 1041801 | 3/2000 | .......... H04M/3/493 |
| WO | WO 01/50453 | 7/2001 | |

* cited by examiner

Primary Examiner—Harry S. Hong
(74) Attorney, Agent, or Firm—Welsh & Katz, Ltd.

(57) ABSTRACT

A method and apparatus are provided for measuring a call handling efficiency of a call center. The method includes the steps of measuring a touch-point indicia for a call and adding the measured indicia to a touch point history of the call.

40 Claims, 2 Drawing Sheets

US 6,868,153 B2

CUSTOMER TOUCH-POINT SCORING SYSTEM

FIELD OF THE INVENTION

The invention relates to communication systems and more particularly to call centers.

BACKGROUND OF THE INVENTION

Call-centers are generally known. A call-center is typically used wherever a large number of calls must be handled for some common enterprise. Typically, the calls of the enterprise are routed through the call-center as a means of processing the calls under a common format.

Call-centers typically include at least three elements: an automatic call distributor (ACD), a group of agents for handling the calls, and a host computer containing customer information. The individual agents of the groups of agents are each typically provided with a telephone console and a computer terminal. The telephone terminal receives customer calls distributed to the agent by the ACD. The terminal may be used to retrieve customer records from the host.

Call-centers are typically automated in the delivery of calls to agents and in the retrieval of customer records for use by agents. Features within the PSTN such as dialed number identification service (DNIS) and automatic number identification (ANI) may be used to determine not only the destination of the call, but also the identity of the caller. DNIS and ANI information, in fact, may be delivered by the PSTN to the ACD in advance of call delivery.

Based upon the destination of the call and identity of the caller, the ACD may select the agent most qualified to service the call. By sending an identifier of the selected agent along with the identity of the caller to the host, the host may automatically retrieve and download customer records to the agent's terminal at the same instant as the call arrives.

While call-centers are effective, the skill level of agents varies considerably. Difficult calls are often transferred among a number of agents, leading to frustration on the part of callers and loss of opportunities on the part of the organization. Accordingly, a need exists for a better way of tracking the resources used in servicing calls.

SUMMARY

A method and apparatus are provided for measuring a call handling efficiency of a call center. The method includes the steps of measuring a touch-point indicia for a call and adding the measured indicia to a touch point history of the call.

DETAILED DESCRIPTION OF AN ILLUSTRATED EMBODIMENT

Figure 1:
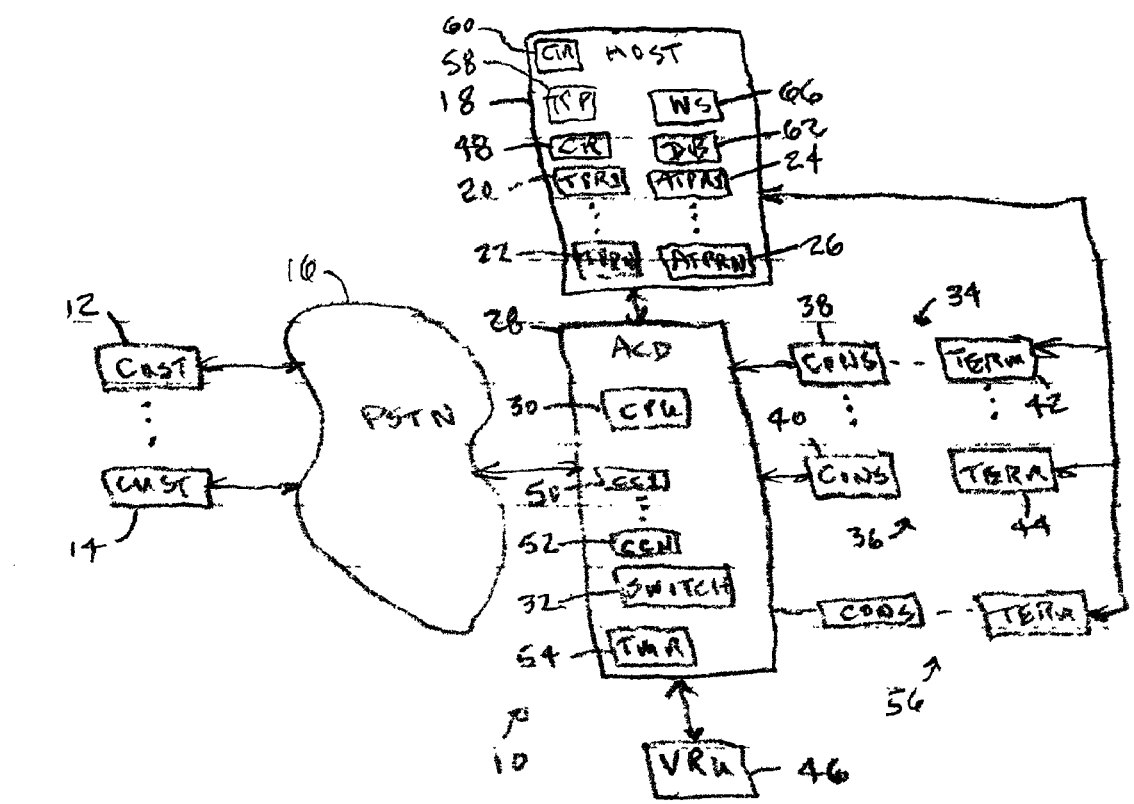
FIG. 1 is a block diagram of a call processing system in accordance with an illustrated embodiment of the invention.

FIG. 1 is a block diagram of a call processing system 10, shown generally in accordance with an illustrated embodiment of the invention. Under the illustrated embodiment, the presence of a customer call may be measured at any point within the call center 10 that the call touches (i.e., is connected to) (hereinafter referred to as a "touch point"). Measurement of the presence of the customer call, in one example, may simply mean incrementing a counter containing the number of touch points that a call has passed through during any one continuous call connection in resolving the issue prompting the call.

Counting the number of touch points that a call has passed through while connected to the call center 10 allows an agent to gauge a state of mind of a caller, in advance of call pick-up. To prepare the agent for the call, the number of touch points and/or a touch point history of the call may be displayed on a terminal of the agent in advance of call pick-up. As used herein, a touch point history means the number of destinations to which a participant of a telephone call has been connected while the call is connected to the call center 10.

In addition to preparing an agent for handling the call, the concept of touch points may also be used as a measure of the efficiency of the call center. For example, by measuring and retaining the number of touch points for each call, the need for training or re-training may be determined by the average number of touch points required for each type of call.

In addition to preparing agents to receive calls, the concept of the touch point may be extended to both caller and agent. In the case of the agent, the concept of the touch point may include the number of information resources that an agent has had to access during a call to resolve the issue prompting the call.

In the case of an agent, the average number of touch points per call may be viewed as a reflection of agent training and ability. The average number of touch points may be used as a criteria for agent training or compensation.

In a more general sense, any number of indicia of touch points (i.e., touch point indicia) may be used for measuring touch points. As used herein, a touch-point indicia is a measure of the contact or contacts that a human participant of a call has had with information resources within a call center during any one telephone call. A contact within the call center means the transfer of information either to or from the human participant. An information resource may be an agent, agent supervisor, database or even a voice response unit of the call center 10.

While providing touch point indicia as a numeric value is relatively useful, the time that a call remains at a touch point may also be viewed of value both in evaluating call center efficiency and also in measuring customer frustration. As such, the touch-point indicia may also include a measure of the time that a customer remained connected with an information resource of the call center. The measured touch point indicia may also be the number and length of times that the calling human participant remains on hold or in a call queue waiting for an agent of the call center.

Turning now to the drawings, a description will be provided of the elements of FIG. 1. Following a description of the elements of FIG. 1, an example will be provided of methods of using elements of FIG. 1 under illustrated embodiments of the invention.

The system 10 of FIG. 1 may include a host 18 and ACD 28. A number of agent stations 34, 36 may be provided through which agents may receive calls from customers 12, 14. Each agent station 34, 36 may include a telephone console 38, 40 through which an agent may converse with customers 12, 14. The agent stations 34, 36 may also each include a terminal 42, 44 through which the agents may retrieve customer records from and make order entries into a database 48 within the host 18.

The ACD 28 may also include a voice response unit (VRU) 46. The VRU 46 may function to receive calls from customers 12, 14, presenting menu options to callers and deciphering responses.

Calls are delivered to the ACD 28 from customers 12, 14, through the PSTN 16. As the calls arrive, they may be delivered along with call associated information (e.g., DNIS, ANI, etc.).

As the calls are detected by a CPU 30 at the switch 32, the CPU 30 assigns a call identifier to the call and transfers a call arrival message to the host 18. The call arrival message may include the call identifier and the call associated information of the call.

From the call associated information, the host 18, or CPU 30 may select an agent 34, 36. Agent selection may be based upon any of a number of factors (e.g., caller identity based upon ANI information, call destination based upon DNIS information, etc.).

Upon selecting an agent, the CPU 30 may instruct the switch 32 to couple the call to a console 38, 40 of the selected agent 34, 36. Once the switch 32 connects the call to the console 38, 40 of the agent 34, 36, the console may begin to ring and the agent 34, 36 may answer the call and begin speaking with the customer 12, 14.

The CPU 30 may also send an agent selection message to the host 18. The agent selection message may contain the call identifier and identifier of the selected agent 34, 36. In response, the host 18 may retrieve customer records and cause them to appear on the terminal 42, 44 of the agent 34, 36 at the same instant as the console 38, 40 begins to ring.

If the call associated information does not contain enough information to select an agent (or if all the agents are busy), the CPU 30 may place the call in one of a number of call queues 50, 52 or route the call to the VRU 46.

If the call is routed to the VRU 46, additional information may be collected. Based on the additional information, the call may be routed to an agent as described above or place the call in a call queue 50, 52.

In addition to routing calls, the CPU 30 may also collect touch point information. As each call arrives at the ACD 28, a touch point record (TPR) 20, 22 may be created containing the touch point history of the call. The TPR 20, 22 may be a separate record that follows the call wherever it goes or it may be maintained as part of the call record created upon call arrival.

For example, a call may be placed to the ACD 28 by the customer 12. Once the call arrives at the ACD 28, the CPU 30 may search for an available agent 34, 36. If an agent 34, 36 is not available, the CPU 30 may place the call in a call queue 50, 52.

At the same time as the CPU 30 places the call in the call queue, the CPU 30 may send a touch point message, notifying the host 18 that the call was placed in the call queue 50, 52. The host 18, upon receiving the message, may add the touch point message to the TPR 20, 22 created for the call. Adding the touch point message to the TPR 20, 22 means incrementing a counter 60 containing the number of touch points experienced by the call since arrival at the call center 10.

At the same time as the call is placed in the call queue 50, 52, the CPU 30 may also start a timer 54 to measure the time that the call remained in queue. When the call is later finally taken out of the queue 50, 52, the CPU 30 may send another touch point message to the host 18 including the time that the call remained in the queue 50, 52. The host 18 places the time within the TPR 20, 22 for that call as further information regarding that particular touch point.

After a time period, the CPU 30 may take the call out of the call queue 50, 52 and transfer the call to an agent 34, 36 or to the VRU 46. If the call is transferred to the VRU 46, the CPU 30 again composes a touch point message and sends it to the host 18. The CPU 30 may also time and send a message to the host 18 regarding the duration of the touch point with the VRU 46. The host 18 may receive the messages and add the new touch point information to the TPR 20, 22.

At some point, the CPU 30 may assign the call to an agent 34, 36. Agent selection, as described above, may be based upon agent idle time, agent skill, or any other criteria.

When the call is transferred to the selected agent 34, 36, the CPU 30 transfers a touch point message to the host 18. The CPU 30 may also time and send a message to the host 18 regarding the duration of the contact with the agent 34, 36.

The agent 34, 36 may converse with the caller and eventually the call may terminate once the caller's concerns have been satisfied. Alternatively, the agent 34, 36 may find that he cannot answer the caller's questions and may transfer the call to another agent 34, 36.

Figure 2:
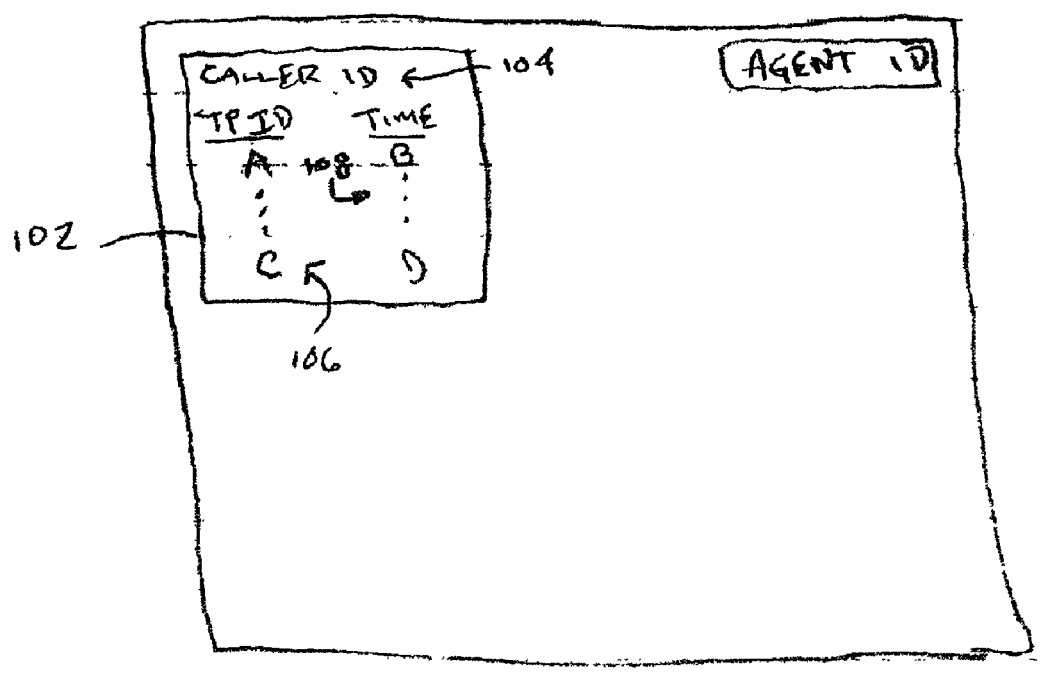
FIG. 2 is a screen that may be displayed by the system of FIG. 1.
Figure 1:
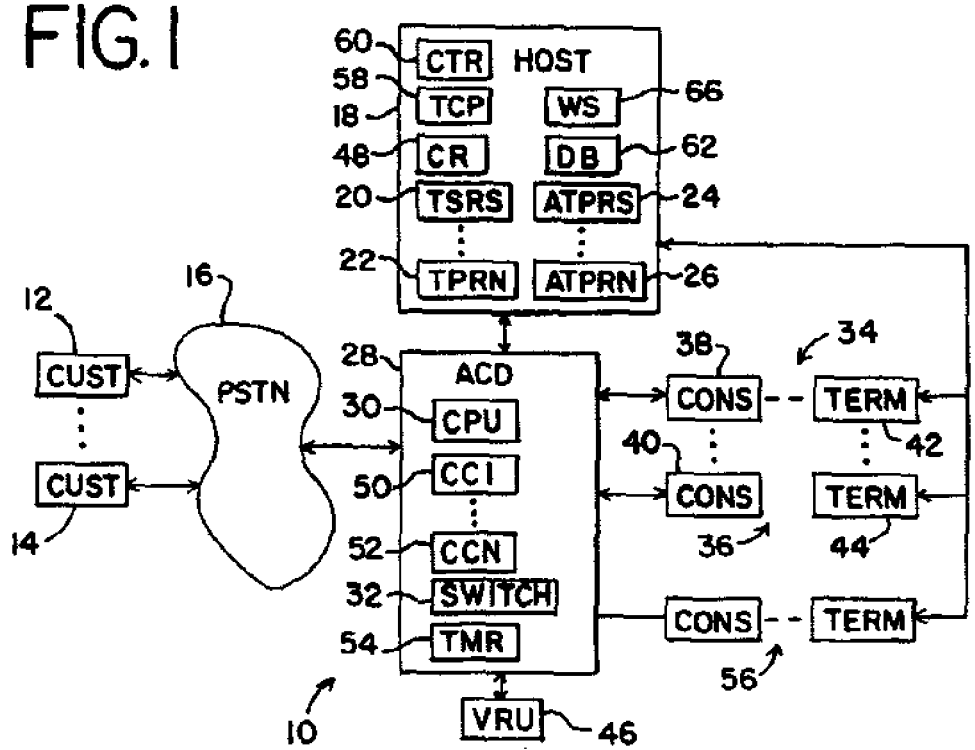
Figure 2:
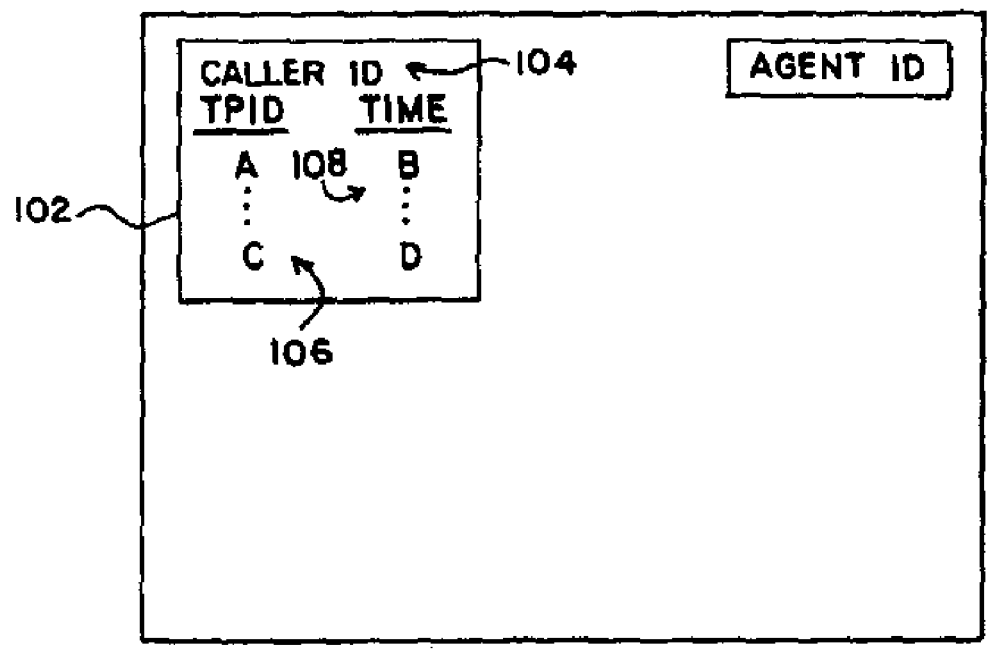

FIG. 2 depicts a touch point summary 102 that may be displayed on a screen 100 provided through a terminal 42, 44 of an agent 34, 36. The screen 100 and summary 102 may be part of an initial screen pop that appears on a terminal 42, 44 of an agent 34, 36 during call delivery.

As shown in FIG. 2, the summary may include a caller identifier 104 and a list of touch points. The list of touch points may include a line reserved for information about each touch point. An identifier 106 (e.g., "A", "C", etc.) of each touch point may be shown along a left end of each line. A duration 108 (e.g., "B" seconds, "D" seconds, etc.) of each touch point may be shown along a right end of each touch point line of the list of touch points.

In the example given above, of a caller 12, 14 directing a call to the system 10, the first entry (line) may contain an identifier 106 and an amount of time 108 spent in the call queue 50, 52. The next entry may include an identifier and time spent with the IVR 46. Subsequent entries may be identifiers and time spent with any agents 34, 36 handling the call.

As calls arrive from the PSTN 16, each call may be typed (i.e., classified) based upon the call associated information. For example, if the organization is a department store, then calls may be assigned to particular call types based upon DNIS information (e.g., ladies shoes, mens ware, etc.).

Alternatively, calls may be classified based upon the identity of the caller. In the case of calls arriving through the PSTN 16, ANI information may be used by the host 18 to identify callers through customer records (CRs) 48. From the CRs 48, a call may be classified based upon any appropriate criteria (e.g., prior purchases, interests, customer preferences, etc.).

Calls may also be classified based upon information received from the caller through the VRU 46. In the case of information received from the caller, the classification may be based upon menu selection or upon entry of customer identifiers.

Once calls have been classified, calls may be sorted by class and used in conjunction with touch point information to identify problem areas. For example, the TPRs 20, 22 may be sorted by call type and an average number of touch points of each call may be calculated. Call types with an average number of touch points above some threshold value may be regarded as problem calls. Agents charged with handling such calls may be scheduled for training or re-training in an effort to reduce the number of touch points or time needed for handling such calls.

In addition, the concept of touch points may be extended to the individual agents 34, 36 handling calls. Where extended to agents 34, 36, it may be the contacts required by the agent 34, 36 to complete a call that are measured. To measure agent touch points, an agent touch point record (ATPR) 24, 26 may be created for each call. Since an agent 34, 36 may handle many calls during a work shift, many ATPRs 24, 26 may be created for each agent during a work shift.

For example, in the case of a call from a caller (e.g., 12), the call may be received by the ACD 28 and subsequently connected to a selected agent (e.g., 34). When the call is connected to the agent, the CPU 30 may start a timer 54 to measure a duration of the call. The CPU 30 may send a touch point message to the host 18. The touch point message may include at least an identifier of the call and of the agent 34, 36. Upon receipt of the touch point message, the host 18 adds the information to a TPR 20, 22 of the call (as discussed above) and also to the ATPR 24, 26 for the agent 34.

Upon conversing with the caller 12, the agent 34 may find that he needs more information and may access a database (DB) 62 to obtain information. Each time the host 18 detects access to a database 62 by the agent 34, the host 18 may add the access event and time of access as another touch point to the ATPR 24, 26 for the call.

Similarly, in processing the call, the agent 34 may access a search engine on a web site 66. Each time the agent 34 accesses the web site 66, the host 18 may add the access as another touch point to the ATPR 24, 26.

Alternately, the agent 34 may decide that he needs help from a supervisor 56 or another agent 36. To request help, the agent 34 may place the caller 12 on hold and call the supervisor 56 or other agent 36. The step of placing the call on hold and calling the supervisor 56 or other agent 36 may be detected by the CPU 30.

In response to detecting the call to the supervisor 56 or other agent 36, the CPU 30 may compose a touch point message and send the message to the host 18. In response, the host 18 may add the message to the ATPR 24, 26 of the call.

The CPU 30 may also start a timer 54 to measure the length of time the call remains on hold. When the call is taken off hold, the CPU 30 may send another touch point message to the host 18. In response, the host 18 may add the message to the ATPR 24, 26 of the call.

Finally, the CPU 30 may monitor the call connection between the caller 12 and agent 34 for the mode of call termination. If the caller 12 or agent 34 hangs up, the CPU 30 sends a touch point message to the host 18 indicating termination of the call and the terminating side of the call connection. The touch point message may also include the length of the call measured by the timer 54.

Alternatively, if the agent 34 transfers the call to another agent 36 or the supervisor 56, the CPU 30 sends a touch point message to the host 18. In response, the host 18 adds the information to the TPR 20, 22 for the call and also to the ATPR 24, 26 of the agent 34.

Periodically, the supervisor 56 may retrieve the ATPRs 24, 26 for individual or groups of agents 34, 36. A touch point processor 58 may calculate an average number of touch points required per call for each agent. The average number of touch points per call and length of each call may be regarded as a reliable indicator of the training and skill of each agent 34, 36.

Further, an average number of touch points may be calculated for each type of call by each agent 34, 36. Where the average number of touch points exceeds some threshold value, the excess may be regarded as an indicator for the need for training or re-training. Training may be accomplished by providing a recording system for recording calls of agents requiring a relatively low average number of touch points and playing back those calls for the benefit of agents with a relatively high average number of touch points.

Further, TPRs 20, 22 and ATPRs 24, 26 may be retrieved and used by the supervisor 56 to evaluate and troubleshoot operation of the call processing system 10. For example, the call center 10 may be operated by a department store and the supervisor 56 may be associated with a group of agents 34, 36 that services calls directed to ladies shoes. In this case, the supervisor 56 may access the TPRs 20, 22 of calls directed to his agents 34, 36 to confirm from the content of the identifier 104 that only calls directed to ladies shoes are being directed to his group. Alternatively, the supervisor 56 may monitor the average ATPR 24, 26 of each agent 34, 36. If the ATPRs 24, 26 of one or more agents 34, 36, begin to rise, then the supervisor may access the TPRs 20, 22 of calls directed to that agent 34, 36 to confirm that he/she is, in fact, receiving calls for which he/she is qualified.

A specific embodiment of a method and apparatus of a method and apparatus for measuring touch points of telephone calls according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

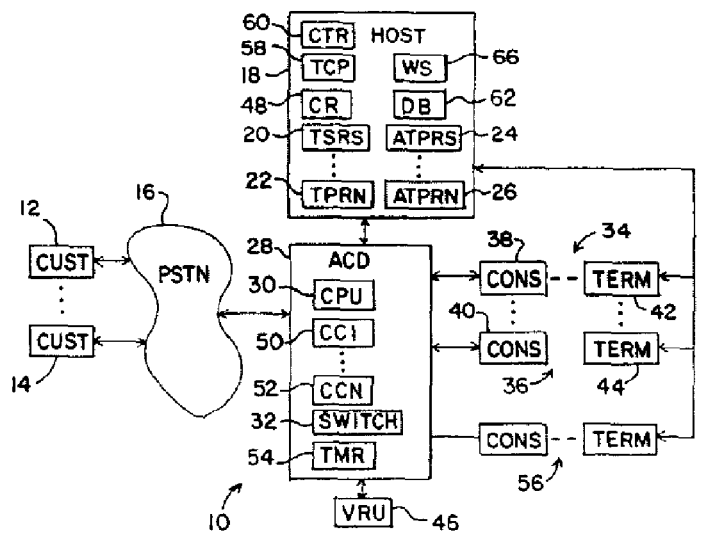

What is claimed is:

1. A method of measuring a call handling efficiency of a call center, such method comprising the steps of:

measuring a touch-point indicia of a call; and adding the measured indicia to a touch point history of the call.

2. The method of measuring the call handling efficiency as in claim 1 further comprising displaying the touch-point history on a terminal of an agent handling the call.

3. The method of measuring the call handling efficiency as in claim 2 further comprising displaying the touch-point history on a terminal of a supervisor of the agent handling the call.

4. The method of measuring the call handling efficiency as in claim 1 wherein the step of measuring the touch-point indicia further comprises determining a number of touch points among which the call was transferred during the call.

5. The method of measuring the call handling efficiency as in claim 1 wherein the step of measuring the touch-point indicia further comprises measuring a time of each contact of the caller with information resources of the call center.

6. The method of measuring the call handling efficiency as in claim 5 wherein the step of measuring a time of each contact of the caller with information resources of the call center further comprises storing the measured time in the touch point history of the call.

7. The method of measuring the call handling efficiency as in claim 1 wherein the step of measuring the touch-point indicia further comprises measuring a length of time that the call has been on hold.

8. The method of measuring the call handling efficiency as in claim 7 wherein the step of measuring a time the call was on hold further comprises storing the measured time in the touch point history of the call.

9. The method of measuring the call handling efficiency as in claim 1 wherein the step of measuring the touch-point indicia further comprises measuring a length of time that the call has been in a call queue.

10. The method of measuring the call handling efficiency as in claim 9 wherein the step of measuring the length of time that the call has been in a call queue further comprises storing the measured time in the touch point history.

11. The method of measuring the call handling efficiency as in claim 1 further comprising determining a call type of the call.

12. The method of measuring the call handling efficiency as in claim 11 wherein the step of determining the call type further comprises comparing the measured touch point indicia with a threshold value of the call type.

13. The method of measuring the call handling efficiency as in claim 12 wherein the step of comparing the measured touch point indicia with a threshold value further comprises training agents responsible for the call type when the compared touch point indicia of the call exceeds the threshold value.

14. The method of measuring the call handling efficiency as in claim 13 wherein the step of measuring the touch-point indicia further comprises determining a number of information resources that an agent has accessed while handling the call.

15. The method of measuring the call handling efficiency as in claim 14 wherein the step of determining the number of information resources that an agent has accessed while handling the call further comprises comparing the determined number with a threshold value.

16. The method of measuring the call handling efficiency as in claim 15 wherein the step of comparing the determined number with a threshold value further comprises training the agent when the determined number exceeds the threshold value.

17. An apparatus for measuring a call handling efficiency of a call center, such method comprising the steps of:
means for measuring a touch-point indicia of a call; and
means for adding the measured indicia to a touch point history of the call.

18. The apparatus for measuring the call handling efficiency as in claim 17 further comprising means for displaying the touch-point history on a terminal of an agent handling the call.

19. The apparatus for measuring the call handling efficiency as in claim 18 further comprising means for displaying the touch-point history on a terminal of a supervisor of the agent handling the call.

20. The apparatus for measuring the call handling efficiency as in claim 17 wherein the means for measuring the touch-point indicia further comprises means for determining a number of touch points among which the call was transferred during the call.

21. The apparatus for measuring the call handling efficiency as in claim 17 wherein the means for measuring the touch-point indicia further comprises means for measuring a time of each contact of the caller with information resources of the call center.

22. The apparatus for measuring the call handling efficiency as in claim 21 wherein the means for measuring a time of each contact of the caller with information resources of the call center further comprises means for storing the measured time in the touch point history of the call.

23. The apparatus for measuring the call handling efficiency as in claim 17 wherein the means for measuring the touch-point indicia further comprises means for measuring a length of time that the call has been on hold.

24. The apparatus for measuring the call handling efficiency as in claim 23 wherein the means for measuring a time the call was on hold further comprises means for storing the measured time in the touch point history of the call.

25. The apparatus for measuring the call handling efficiency as in claim 17 wherein the means for measuring the touch-point indicia further comprises means for measuring a length of time that the call has been in a call queue.

26. The apparatus for measuring the call handling efficiency as in claim 25 wherein the means for measuring the length of time that the call has been in a call queue further comprises means for storing the measured time in the touch point history.

27. The apparatus for measuring the call handling efficiency as in claim 17 further comprising means for determining a call type of the call.

28. The apparatus for measuring the call handling efficiency as in claim 17 wherein the means for determining the call type further comprises means for comparing the measured touch point indicia with a threshold value of the call type.

29. The apparatus for measuring the call handling efficiency as in claim 17 wherein the means for comparing the measured touch point indicia with a threshold value further comprises means for training agents responsible for the call type when the compared touch point indicia of the call exceeds the threshold value.

30. The apparatus for measuring the call handling efficiency as in claim 17 wherein the means for measuring the touch-point indicia further comprises means for determining a number of information resources that an agent has accessed while handling the call.

31. The apparatus for measuring the call handling efficiency as in claim 17 wherein the means for determining the number of information resources that an agent has accessed while handling the call further comprises means for comparing the determined number with a threshold value.

32. The apparatus for measuring the call handling efficiency as in claim 31 wherein the means for comparing the determined number with a threshold value further comprises means for training the agent when the determined number exceeds the threshold value.

33. An apparatus for measuring a call handling efficiency of a call center, such method comprising the steps of:
a central processing unit adapted to measure a touch-point indicia for a call; and
a host adapted to add the measured indicia to a touch point history of the call.

34. The apparatus for measuring a call handling efficiency as in claim 33 further comprising an agent terminal adapted to display the touch-point history of the call.

35. The apparatus for measuring a call handling efficiency as in claim 33 wherein the central processing unit further comprises a touch point record adapted to contain a number of touch points among which the call was transferred during the call.

36. The apparatus for measuring a call handling efficiency as in claim 33 wherein the central processing unit further comprises a timer adapted to measure a time of each contact of the caller with information resources of the call center.

37. The apparatus for measuring a call handling efficiency as in claim 33 wherein the touch point indicia further comprises a cumulative number of touch points of the call center to which the call has been connected.

38. The apparatus for measuring a call handling efficiency as in claim 37 wherein a touch point of the touch points further comprise an information resource of the call center.

39. The apparatus for measuring a call handling efficiency as in claim 37 wherein the touch point further comprises a call queues of the call center.

40. The apparatus for measuring a call handling efficiency as in claim 37 wherein the touch point further comprises a state of being on hold with an agent of the call center.

* * * * *

UNITED STATES PATENT AND TRADEMARK OFFICE
CERTIFICATE OF CORRECTION

PATENT NO. : 6,868,153 B2
DATED : March 15, 2005
INVENTOR(S) : Dezonno et al.

It is certified that error appears in the above-identified patent and that said Letters Patent is hereby corrected as shown below:

Title page, illustrating figure(s) should be deleted, and substitute therefore, the title page illustrating figure(s). (attached)

Delete drawing sheets 1 & 2, and substitute therefore drawing sheets 1 & 2. (attached)

Signed and Sealed this

Seventeenth Day of May, 2005

JON W. DUDAS
*Director of the United States Patent and Trademark Office*

(12) United States Patent
Dezonno et al.

(10) Patent No.: US 6,868,153 B2
(45) Date of Patent: Mar. 15, 2005

(54) CUSTOMER TOUCH-POINT SCORING SYSTEM

(75) Inventors: Anthony Dezonno, Bloomingdale, IL (US); Jeff Hodson, Wheaton, IL (US); Roger Sumner, Batavia, IL (US); Carlo Bonifazi, Woodridge, IL (US); Mark Michelson, Elburn, IL (US); Robert Beckstrom, Bolingbrook, IL (US); Mark Power, Carol Stream, IL (US); Craig Shambaugh, Wheaton, IL (US)

(73) Assignee: Rockwell Electronic Commerce Technologies, LLC, Wood Dale, IL (US)

(*) Notice: Subject to any disclaimer, the term of this patent is extended or adjusted under 35 U.S.C. 154(b) by 543 days.

(21) Appl. No.: 10/096,235

(22) Filed: Mar. 12, 2002

(65) Prior Publication Data
US 2003/0174829 A1 Sep. 18, 2003

(51) Int. Cl.$^7$ .................................. H04M 3/523
(52) U.S. Cl. ................... 379/265.03; 379/265.05; 379/265.06; 379/265.08; 379/266.01
(58) Field of Search .............. 379/265.01, 265.02, 379/265.03, 265.05, 265.06, 265.08, 266.01

(56) References Cited

U.S. PATENT DOCUMENTS

| | | | |
|---|---|---|---|
| 5,313,517 A | * 5/1994 | Inaguma | 379/266.06 |
| 5,546,456 A | 8/1996 | Vilsoet et al. | 379/265.08 |
| 5,715,306 A | * 2/1998 | Sunderman et al. | 379/265.02 |
| 5,715,307 A | * 2/1998 | Zazzera | 379/265.03 |
| 5,953,405 A | * 9/1999 | Miloslavsky | 379/265.01 |
| 5,978,465 A | 11/1999 | Corduroy et al. | 379/265.02 |
| 6,061,433 A | * 5/2000 | Polcyn et al. | 379/93.12 |
| 6,154,527 A | 11/2000 | Porter et al. | 379/88.18 |
| 6,157,655 A | 12/2000 | Shtivelman | 370/412 |
| 6,160,875 A | * 12/2000 | Park et al. | 379/133 |
| 6,163,607 A | 12/2000 | Bogart et al. | 379/266.01 |
| 6,173,053 B1 | 1/2001 | Bogart et al. | 379/266.01 |
| 6,212,178 B1 | 4/2001 | Beck et al. | 370/352 |
| 6,314,402 B1 | 11/2001 | Monaco et al. | 704/275 |
| 6,332,154 B2 | 12/2001 | Beck et al. | 709/204 |
| 6,334,107 B1 | 12/2001 | Gale et al. | 705/10 |
| 6,459,788 B1 | * 10/2002 | Khuc et al. | 379/265.09 |

FOREIGN PATENT DOCUMENTS

| | | | |
|---|---|---|---|
| EP | 1026871 | 1/2000 | H04M/3/493 |
| EP | 1041801 | 3/2000 | H04M/3/493 |
| WO | WO 01/50453 | 7/2001 | |

* cited by examiner

*Primary Examiner*—Harry S. Hong
(74) *Attorney, Agent, or Firm*—Welsh & Katz, Ltd.

(57) ABSTRACT

A method and apparatus are provided for measuring a call handling efficiency of a call center. The method includes the steps of measuring a touch-point indicia for a call and adding the measured indicia to a touch point history of the call.

40 Claims, 2 Drawing Sheets